United States Patent
Wen et al.

(10) Patent No.: US 9,532,314 B2
(45) Date of Patent: Dec. 27, 2016

(54) METHOD AND APPARATUS FOR UPLINK TRANSMISSION POWER CONTROL OF MULTI-LINK CONNECTIONS

(71) Applicant: Alcatel Lucent, Boulogne Billancourt (FR)

(72) Inventors: Pingping Wen, Shanghai (CN); Chandrika Worrall, Newbury (GB)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 14/781,718

(22) PCT Filed: Mar. 21, 2014

(86) PCT No.: PCT/IB2014/000566
§ 371 (c)(1),
(2) Date: Oct. 1, 2015

(87) PCT Pub. No.: WO2014/162201
PCT Pub. Date: Oct. 9, 2014

(65) Prior Publication Data
US 2016/0050631 A1    Feb. 18, 2016

(30) Foreign Application Priority Data
Apr. 3, 2013 (CN) .......................... 2013 1 0116894

(51) Int. Cl.
H04W 52/14 (2009.01)
H04W 52/24 (2009.01)
(Continued)

(52) U.S. Cl.
CPC ......... H04W 52/146 (2013.01); H04W 52/242 (2013.01); H04W 52/40 (2013.01);
(Continued)

(58) Field of Classification Search
CPC ........................... H04W 52/146; H04W 52/30
(Continued)

(56) References Cited

U.S. PATENT DOCUMENTS

| | | | | | |
|---|---|---|---|---|---|
| 2010/0246705 | A1* | 9/2010 | Shin | ...................... | H04W 52/42 375/267 |
| 2012/0329503 | A1* | 12/2012 | Jongren | ................ | H04W 52/10 455/509 |
| 2015/0133179 | A1* | 5/2015 | Li | ...................... | H04W 52/146 455/522 |

FOREIGN PATENT DOCUMENTS

| WO | WO 2010/107885 A2 | 9/2010 |
|---|---|---|
| WO | WO 2013/017948 A2 | 2/2013 |

OTHER PUBLICATIONS

Texas Instruments, "UL Power Control for CoMP," 3rd Generation Partnership Project (3GPP), 3GPP TSG RAN WG1 #66bis, R1-113246, pp. 1-3, XP050538359, Zhuhai, China, Oct. 10-14, 2011.

(Continued)

Primary Examiner — John J Lee
(74) Attorney, Agent, or Firm — Fay Sharpe, LLP

(57) ABSTRACT

The present invention relates to a method and an apparatus for uplink transmission power control (TPC) of multi-link connections. The method for uplink TPC of multi-link connections according to an embodiment of the present invention includes: a user equipment (UE) receiving a cell path loss compensating factor and a reference power level of each carrier of each connection in the multi-link connections, receiving an uplink transmission power adjustment amount of each carrier of each connection in the multi-link connections, and measuring a path loss of each carrier of each connection in the multi-link connections. According to the received cell path loss compensating factor, reference power level, and uplink transmission power adjustment amount, and the measured path loss, the UE calculates uplink transmission power of each carrier of each connection in the multi-link connections, and transmits data based on the uplink transmission power.

17 Claims, 5 Drawing Sheets

(51) Int. Cl.
  *H04W 52/40* (2009.01)
  *H04W 52/08* (2009.01)
  *H04W 52/26* (2009.01)
  *H04W 52/34* (2009.01)

(52) U.S. Cl.
  CPC .......... *H04W 52/08* (2013.01); *H04W 52/265* (2013.01); *H04W 52/34* (2013.01)

(58) Field of Classification Search
  USPC .......... 455/509, 452.1, 522, 69, 67.11, 67.13
  See application file for complete search history.

(56) References Cited

OTHER PUBLICATIONS

LG Electronics, "Proposal on Initial UL PC in multiple TA," $3^{rd}$ Generation Partnership Project (3GPP), 3GPP TSG RAN WG1 #70bis, R1-124664, pp. 1-8, XP050662524, San Diego, USA, Oct. 8-12, 2012.
International Search Report for PCT/IB2014/000566 dated Jul. 15, 2014.
"Physical Layer Design for Dual Connectivity," 3GPP TSG RAN WG1, Meting #72, R1-130409, St. Julian's, Malta, Jan. 28-Feb. 1, 2013, 3 pages.

* cited by examiner

METHOD AND APPARATUS FOR UPLINK TRANSMISSION POWER CONTROL OF MULTI-LINK CONNECTIONS

BACKGROUND OF THE INVENTION

1. Field of the Invention

The present invention relates to uplink transmission power in the field of wireless communications, and in particular, to a method and an apparatus for uplink transmission power control (TPC) of multi-link connections.

2. Description of the Prior Art

The Long Term Evolution (LTE)/LTE-A (LTE-Advanced) project is the biggest new technology R&D project launched by the 3rd Generation Partnership Project (3GPP) in recent years, and this technology, with the orthogonal frequency division multiplexing/frequency division multiple access (OFDM/FDMA) as a core, is regarded as a "quasi-4G" technology. The LTE/LTE-A will be the leading wide-area broadband mobile communications system, and in the future, all 2G, 3G, and 3.5G technologies will be advanced to the LTE/LTE-A stage.

As low-power nodes improve the capacity and solve the problem of blind spot coverage, the deployment and increase of small cells draw great attention in the LTE/LTE-A, and related achievement has been expressed in 3GPP R12. If a user equipment (UE) establishes multiple link connections, for example, establishes a first connection with a macro cell and establishes a second connection with a pico cell (the pico cell is typical small cell), the UE can avoid frequent handovers among densely deployed pico cells through the first connection with the macro cell, and at the same time, can obtain a throughput gain through the second connection with the pico cell. However, how to implement uplink TPC while supporting multi-link connections, especially in a co-channel case, becomes a problem that must be solved. If this problem cannot be solved, further development and application of the multi-link connection technology will be affected.

SUMMARY OF THE INVENTION

The present invention is directed to a method and an apparatus for uplink TPC of multi-link connections.

An embodiment of the present invention provides a method for uplink TPC of multi-link connections, and the method includes: a UE receiving a cell path loss compensating factor and a reference power level of each carrier of each connection in the multi-link connections, receiving an uplink transmission power adjustment amount of each carrier of each connection in the multi-link connections, and measuring a path loss of each carrier of each connection in the multi-link connections. Based on the received cell path loss compensating factor, reference power level, and uplink transmission power adjustment amount, and the measured path loss, the UE calculates uplink transmission power of each carrier of each connection in the multi-link connections, and transmits data on each carrier of each connection in the multi-link connections based on the uplink transmission power. In an embodiment, the UE receives the cell path loss compensating factor and the reference power level from each corresponding base station in the multi-link connections. In an embodiment, the multi-link connections comprise a connection established between the UE and a macro base station and a connection established between the UE and a micro base station. For at least one connection, among the multi-link connections, established between the UE and the micro base station, the UE receives the path loss compensating factor and the reference power level thereof from at least one corresponding macro base station in the multi-link connections. The reference power level comprises a cell reference power level and a user offset, the cell reference power level being sent through a broadcast channel, and the user offset being sent through radio resource control (RRC) signaling. The user offset is related to quality of a service run by the UE on the connection. According to an embodiment of the present invention, the UE receives a TPC command from each corresponding base station in the multi-link connections, the TPC command indicating the uplink transmission power adjustment amount. In addition, when the multiple connections use a same carrier, the UE transmits data on the multi-link connections in a static or semi-static time division multiplexing manner.

An embodiment of the present invention further provides a UE capable of executing the method for uplink TPC. In an embodiment, the UE includes: a parameter receiving apparatus, for receiving a cell path loss compensating factor and a reference power level of each carrier of each connection in the multi-link connections of the UE; a power adjustment amount receiving apparatus, for receiving an uplink transmission power adjustment amount of each carrier of each connection in the multi-link connections, and measuring a path loss of each carrier of each connection in the multi-link connections; a calculation apparatus, for calculating uplink transmission power of each carrier of each connection in the multi-link connections based on the received path loss compensating factor, reference power level, and uplink transmission power adjustment amount, and the measured path loss; and a transmission apparatus, for transmitting data on each carrier of each connection in the multi-link connections based on the uplink transmission power.

In another embodiment, the parameter receiving apparatus receives the cell path loss compensating factor and the reference power level from each corresponding base station in the multi-link connections. For at least one connection, among the multi-link connections, established between the UE and the micro base station, the parameter receiving apparatus receives the path loss compensating factor and the reference power level from at least one corresponding macro base station in the multi-link connections. The power adjustment amount receiving apparatus receives a TPC command from each corresponding base station in the multi-link connections, the TPC command indicating the uplink transmission power adjustment amount.

An embodiment of the present invention further provides a method for uplink TPC of multi-link connections, where the multi-link connections comprise a first connection established between a UE and a macro base station and a second connection established between the UE and a micro base station. In an embodiment, the method includes: the macro base station sending a path loss compensating factor and a reference power level of each carrier of each of the first connection and the second connection to the UE; and the macro base station sending an uplink transmission power adjustment amount of each carrier of the first connection to the UE.

Correspondingly, an embodiment of the present invention further provides a macro base station capable of executing the method for uplink TPC, and the macro base station includes: a parameter sending apparatus, for sending a path loss compensating factor and a reference power level of each carrier of each of the first connection and the second connection to the UE; and a power adjustment amount sending apparatus, for sending an uplink transmission power adjustment amount of each carrier of the first connection to the UE.

The present invention solves the problem of uplink TPC in multi-link connections, and further optimizes an LTE/LTE-A system, so that a single UE can be connected with a macro cell and a small cell at the same time, thereby preventing frequent handovers between pico cells and improving a throughput gain. In addition, the present invention also makes it possible to transmit different types of services on different connections according to a requirement of quality of service.

DETAILED DESCRIPTION

In an LTE/LTE-A system, uplink TPC is used for maximizing received signal power while suppressing interference thereof on adjacent cells as far as possible, so as to achieve a balance between a cell edge rate and cell capacity. For one carrier, when the carrier is in a single-link connection, only one path loss needs to be considered in uplink TPC. However, in the case of multi-link connections, the UE establishes connections with multiple base stations, and each connection has a different path loss. The conventional uplink TPC for a single-link connection is not applicable.

A method and an apparatus for uplink TPC of multi-link connections according to the embodiments of the present invention can solve the above problem.

Figure 1:
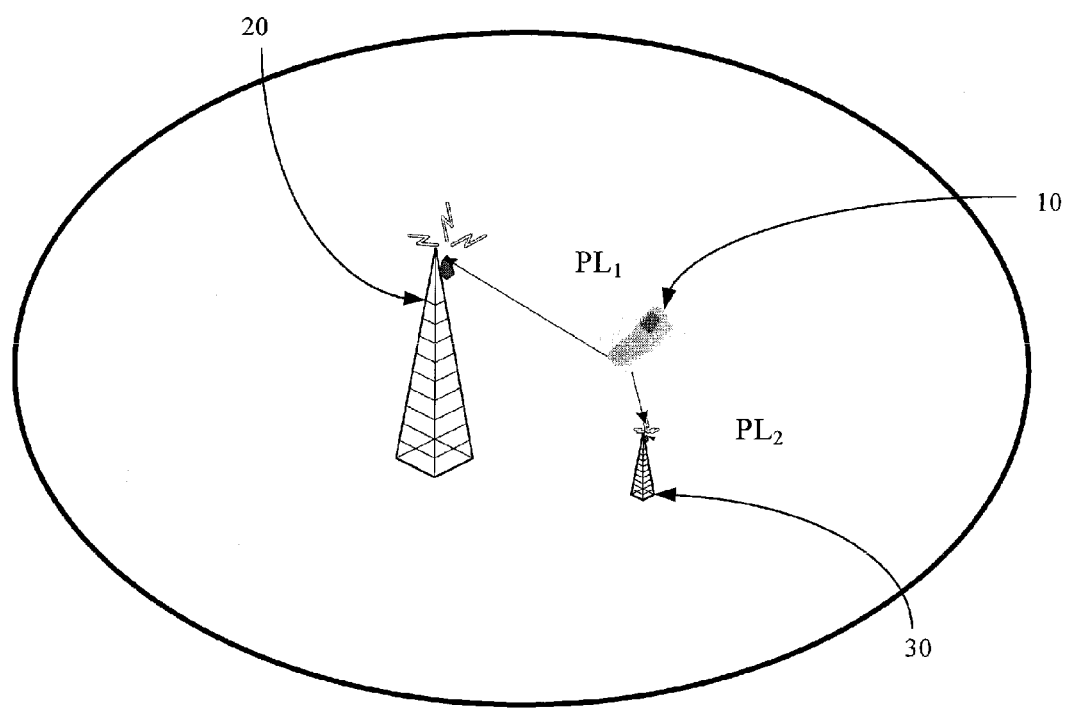
FIG. 1 is a schematic view of an application scenario of a wireless communications system supporting multi-link connections according to an embodiment of the present invention.

FIG. 1 is a schematic view of an application scenario of a wireless communications system supporting multi-link connections according to an embodiment of the present invention. As shown in FIG. 1, a UE 10 supports, on the same channel, a first link connection with a macro base station 20 (which is a base station that defines a macro cell; the macro base station is defined in related protocols, and is not described in detail herein again) and a second connection with a micro base station 30 (which is a base station that defines a micro cell; the micro base station is defined in related protocols, and is not described in detail herein again). Definitely, in other embodiments, the UE 10 may support more link connections. Moreover, these link connections may be connections purely established with the macro base station (macro cell) 20, and may also be connections purely established with the micro base station (micro cell) 30. To support the first connection and second connection in a co-channel case, the UE 10 may send data on the two link connections in a static or semi-static time division multiplexing manner.

Figure 2:
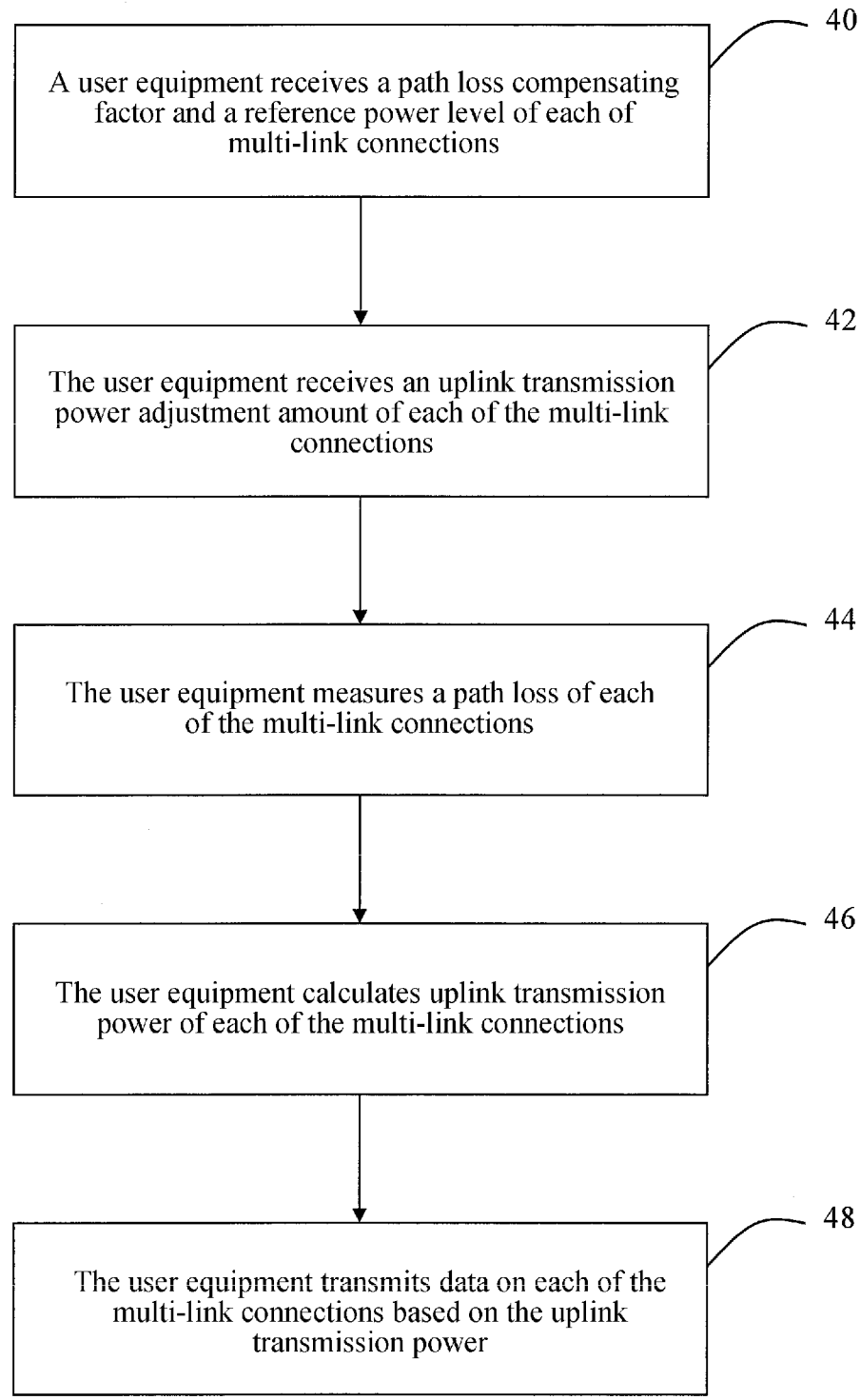
FIG. 2 is a flowchart of an uplink TPC method supporting multi-link connections according to an embodiment of the present invention.

FIG. 2 is a flowchart of a method for uplink TPC supporting multi-link connections according to an embodiment of the present invention. The method for uplink TPC applies to the communication application scenario shown in FIG. 1. It should be noted that FIG. 2 only shows an application on a determined carrier i of carriers in the multi-link connections, and in fact, the application is the same for any carrier of any connection. A person skilled in the art can apply the method to each carrier of each connection; these applications also completely fall within the protection scope of the present invention, and are not described in detail herein. At a transmission time interval, on carrier i, an uplink TPC value may be defined as a function of a path loss between the UE 10 and a base station to which the data is transmitted, such as the macro base station 20 or the micro base station 30. The function may be an uplink transmission power calculation function well known to a person skilled in the art, and the calculation function includes multiple variables such as a reference power level, a path loss compensating factor, a TPC adjustment amount, the number of allocated resources, and MCS compensation. In the present invention, the two variables, namely, the number of allocated resources and MCS compensation, are the same as those in the prior art, and therefore are omitted herein; only the reference power level, the path loss compensating factor, and the TPC adjustment amount are described. For example, for carrier i of the first connection, uplink transmission power $P_1$ of the UE 10 may be controlled as follows:

$$P_1(i)=P0_1(i)+\alpha_1(i)*PL_1(i)+f(\Delta TPC_1(i)) \quad (1)$$

For the determined carrier i, $P0_1$ is a reference power level, which is set by the macro base station 20 for the UE 10, and may include a cell reference power level (cell-specific component) and a user offset (user-specific component); $\alpha_1$ is a path loss compensating factor, which is set by macro base station 20 for the UE 10; $PL_1$ is a path loss of the first connection; $\Delta TPC_1$ is a TPC adjustment amount, which is also set by macro base station 20 for the UE 10. The macro base station 20 sends the cell reference power level in $P0_1$ to the UE 10 through a broadcast channel, and sends the path loss compensating factor $\alpha_1$ and the user offset in $P0_1$ through RRC signaling. The user offset may be related to quality of a service run by the UE on the first connection.

Similarly, for the second connection, on carrier i, uplink transmission power $P_2$ of the UE 10 may be controlled as follows:

$$P_2(i)=P0_2(i)+\alpha_2(i)*PL_2(i)+f(\Delta TPC_2(i)) \quad (2)$$

$P0_2$ is a reference power level, which is set by the micro base station 30 for the UE 10, and may include a cell reference power level (cell-specific component) and a user offset (user-specific component); $\alpha_2$ is a path loss compensating factor, which is also set by the micro base station 30 for the UE 10; $PL_2$ is a path loss of the second connection; $\Delta TPC_2$ is a TPC adjustment amount, which is also set by the micro base station 30 for the UE 10. The micro base station 30 sends the cell reference power level in $P0_2$ to the UE 10 through a broadcast channel, and sends the path loss compensating factor $\alpha_2$ and the user offset in $P0_2$ through RRC signaling. In other embodiments, the path loss compensating factor $\alpha_2$ and reference power level $P0_2$ of the second connection established with the micro base station 30 may be managed, set, and sent by the macro base station 20. For the same UE 10, the cell reference power levels and user offsets of the first connection and the second connection may be the same or different. The user offset is related to quality of a service run by the UE on the second connection.

As shown in FIG. 2, in Step 40, a UE 10 receives a path loss compensating factor and a reference power level of each of multi-link connections. Specifically, in the application scenario in FIG. 1, the UE 10 receives the cell path loss compensating factor $\alpha_1$ and the reference power level $P0_1$ of the first connection from the macro base station 20, and receives the cell path loss compensating factor $\alpha_2$ and the reference power level $P0_2$ of the second connection from the micro base station 30. When the cell path loss compensating factor $\alpha_2$ and the reference power level $P0_2$ of the second connection established by the micro base station 30 (pico cell) are managed and set by the macro base station 20, the UE 10 receives the cell path loss compensating factor $\alpha_2$ and the reference power level $P0_2$ from the macro base station 20.

In Step 42, the UE 10 receives an uplink transmission power adjustment amount of each of the multi-link connections. Likewise, in the application scenario shown in FIG. 1, the UE 10 separately receives the uplink transmission power adjustment amounts $\Delta TPC_1$ and $\Delta TPC_2$ of the first connection and the second connection from the macro base station 20 and the micro base station 30. In this embodiment, the UE 10 separately receives TPC commands from each base station, namely, the macro base station 20 and the micro base station 30, where the TPC commands indicate the uplink transmission power adjustment amounts $\Delta TPC_1$ and $\Delta TPC_2$ of the corresponding connections. In other words, the UE 10 adjusts uplink transmission power $P_1$ and $P_2$ of the connections according to the TPC commands.

In Step 44, the UE 10 measures a path loss on each carrier of each connection in the multi-link connections, for example, path losses $PL_1$ and $PL_2$ of the first connection and the second connection.

In Step 46, based on the received cell path loss compensating factor, reference power level, and uplink transmission power adjustment amount, and the measured path loss, the UE 10 calculates uplink transmission power of each of the multi-link connections, for example, obtains the uplink transmission power $P_1$ and $P_2$ of the first connection and the second connection by means of calculation.

Finally, in Step 48, the UE 10 transmits data on each of the multi-link connections based on the uplink transmission power. For example, on the same carrier, the UE 10 transmits data on the first connection by using the uplink transmission power $P_1$ and transmits data on the second connection by using the uplink transmission power $P_2$ in a static or semi-static time division multiplexing manner.

A person skilled in the art should understand that the flowchart and its descriptions in the present invention are merely for showing the embodiment of the present invention clearly, and do not limit the sequence of the steps unless otherwise specified (the same below). For example, in an embodiment, the UE 10 may receive a reference power level and a path loss compensating factor of each link connection, and then separately measures a path loss of each link connection. The path loss compensating factor and reference power level may be received at a long interval, while the transmission power adjustment amount may be received at a TTI-level, that is, received at a short interval. If multi-connection data transmission is performed on the same carrier in a time division manner, when the UE 10 receives a scheduling permission from a base station of a connection, such as the macro base station 20, the UE 10 calculates uplink transmission power of this connection according to the reference power level, the cell path loss compensating factor, and the measured path loss, and adjusts the uplink transmission power according a received TPC command, thereby controlling the uplink transmission power of the connection.

Figure 3:
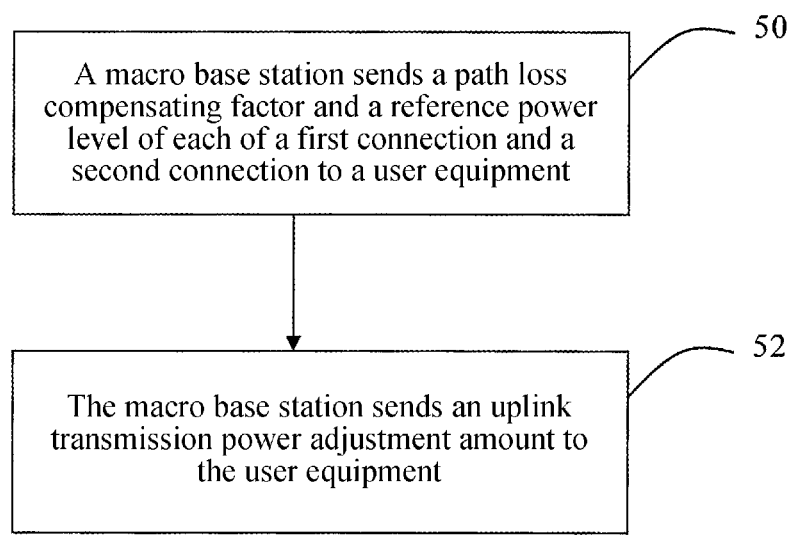
FIG. 3 is a flowchart of a method for uplink TPC supporting multi-link connections according to an embodiment of the present invention.

FIG. 3 is a flowchart of a method for uplink TPC supporting multi-link connections according to an embodiment of the present invention, and can demonstrate a situation where the macro base station 20 sets and sends, in replace of the micro base station 30, the reference power level and cell path loss compensating factor corresponding to the second connection. Likewise, FIG. 3 also shows an application of a determined carrier of the connections. As shown in FIG. 3, in Step 50, the macro base station 20 sends a cell path loss compensating factor and a reference power level of each of a first connection and a second connection to the UE 10. In an embodiment, the reference power level is used for controlling an SINR target. In another embodiment, different types of services can be transmitted on different connections, and related reference power levels are set according to different service quality requirements, such as a block error rate (BLER) requirement. In Step 52, the macro base station 20 sends an uplink transmission power adjustment amount of the first connection to the UE 10. For other embodiments of multi-link connections, one macro base station 20 in the connections may send cell path loss compensating factors and reference power levels of multiple connections established between the UE 10 and the micro base station 30, and it is also possible that multiple macro base stations 20 in the connections set and send, in replace of different micro base stations 30, cell path loss compensating factors and reference power levels.

Figure 4:
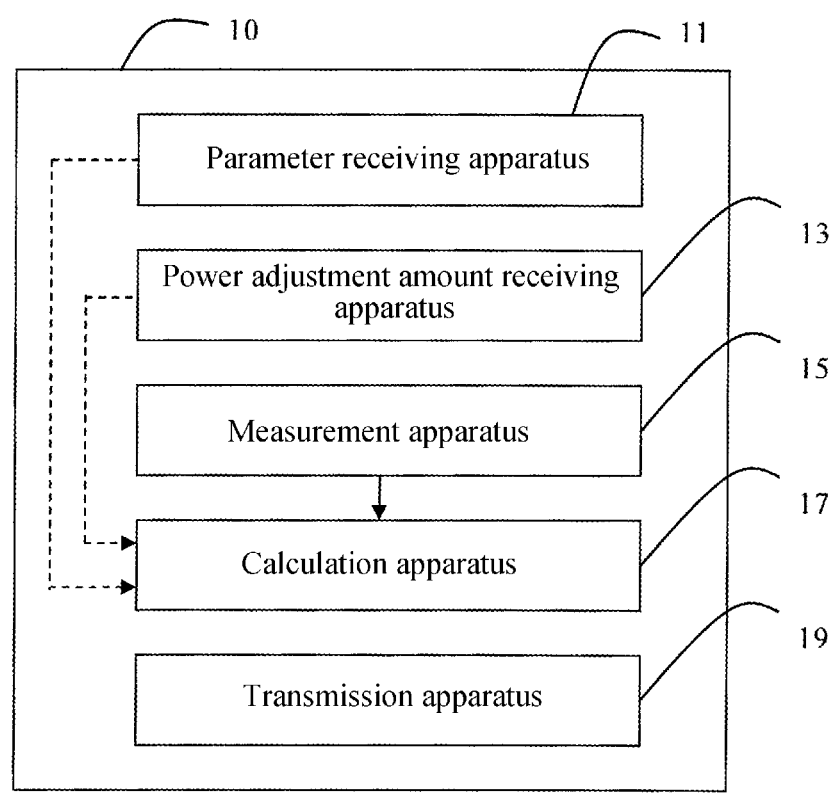
FIG. 4 is a schematic structural diagram of a UE for uplink TPC supporting multi-link connections according to an embodiment of the present invention.

FIG. 4 is a schematic structural diagram of a UE 10 for uplink TPC supporting multi-link connections according to an embodiment of the present invention. The UE 10 can execute the foregoing method for uplink TPC, and includes: a parameter receiving apparatus 11, for receiving a cell path loss compensating factor and a reference power level of each carrier of each connection in the multi-link connections of the UE 10; a power adjustment amount receiving apparatus 13, for receiving an uplink transmission power adjustment amount of each carrier of each connection in the multi-link connections, and measuring a path loss of each carrier of each connection in the multi-link connections; a calculation apparatus 17, for calculating uplink transmission power of each carrier of each connection in the multi-link connections based on the received path loss compensating factor, reference power level, and uplink transmission power adjustment amount, and the measured path loss; and a transmission apparatus 19, for transmitting data on each carrier of each connection in the multi-link connections based on the uplink transmission power.

Figure 5:
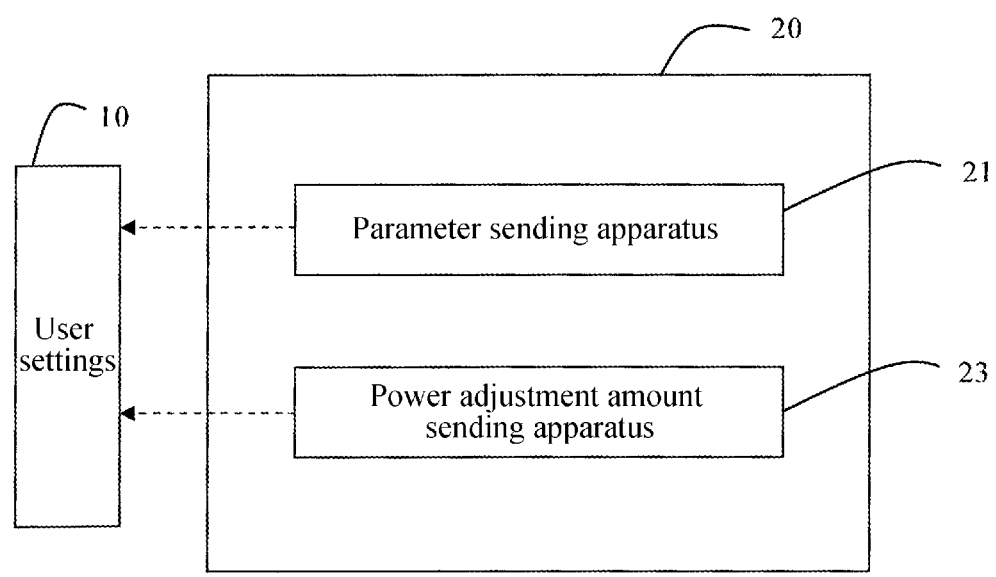
FIG. 5 is a schematic structural diagram of a macro base station for uplink TPC supporting multi-link connections according to an embodiment of the present invention.

FIG. 5 is a schematic structural diagram of a macro base station 20 for uplink TPC supporting multi-link connections according to an embodiment of the present invention. The macro base station 20 includes: a parameter sending apparatus 21, for sending a path loss compensating factor and a reference power level of each carrier of each of a first connection and a second connection to a UE 10; and a power adjustment amount sending apparatus 23, for sending an uplink transmission power adjustment amount of each carrier of the first connection to the UE 10.

The present invention provides a method and an apparatus for uplink TPC supporting multi-link connections, making connections between the same UE with a macro cell and a small cell (such as a pico cell) possible in a case where multi-channel connections are supported, especially in a co-channel case; and therefore, the macro cell provides control plane coverage, and the small cell improves capacity of a data plane by means of load balancing. In addition, multiple link connections are supported, making it possible to transmit different types of services on different connections according to different service quality requirements.

The technical content and technical features of the present invention are disclosed above; however, persons skilled in the art can still make replacements and modifications without departing from the spirit of the present invention based on the teachings and disclosure of the present invention. Therefore, the protection scope of the present invention should not be limited to the content disclosed in the embodiments, but should include various replacements and modifications not departing from the present invention, and be covered by the claims of the present patent application.

We claim:

1. A method for uplink transmission power control (TPC) of multi-link connections, comprising:
   a user equipment (UE) receiving a cell path loss compensating factor and a reference power level of each carrier of each connection in the multi-link connections;
   the UE receiving an uplink transmission power adjustment amount of each carrier of each connection in the multi-link connections; and
   the UE measuring a path loss of each carrier of each connection in the multi-link connections; and
   based on the received path loss compensating factor, reference power level, and uplink transmission power adjustment amount, and the measured path loss, the UE calculating uplink transmission power of each carrier of each connection in the multi-link connections; and
   the UE transmitting data on each carrier of each connection in the multi-link connections based on the uplink transmission power.

2. The method according to claim 1, wherein the UE receives the path loss compensating factor and the reference power level from each corresponding base station in the multi-link connections.

3. The method according to claim 1, wherein the multi-link connections comprise a connection established between the UE and a macro base station and a connection established between the UE and a micro base station.

4. The method according to claim 1, wherein the reference power level comprises a cell reference power level and a user offset, the cell reference power level being sent through a broadcast channel, and the user offset being sent through radio resource control (RRC) signaling.

5. The method according to claim 1, wherein the UE receives a TPC command from each corresponding base station in the multi-link connections, the TPC command indicating the uplink transmission power adjustment amount.

6. The method according to claim 1, wherein when the multiple connections use a same carrier, the UE transmits data on the multi-link connections in a static or semi-static time division multiplexing manner.

7. A user equipment (UE), comprising:
   a parameter receiving apparatus, for receiving a path loss compensating factor and a reference power level of each carrier of each connection in multi-link connections of the UE;
   a power adjustment amount receiving apparatus, for receiving an uplink transmission power adjustment amount ($\Delta$TPC) of each carrier of each connection in the multi-link connections;
   a measurement apparatus, for measuring a path loss PL of each carrier of each connection in the multi-link connections;
   a calculation apparatus, for calculating uplink transmission power P of each carrier of each connection in the multi-link connections based on the received path loss compensating factor, reference power level, and uplink transmission power adjustment amount, and the measured path loss; and
   a transmission apparatus, for transmitting data on each carrier of each connection in the multi-link connections based on the uplink transmission power.

8. The UE according to claim 7, wherein the parameter receiving apparatus receives the path loss compensating factor and the reference power level from each corresponding base station in the multi-link connections.

9. The UE according to claim 7, wherein the multi-link connections comprise a connection established between the UE and a macro base station and a connection established between the UE and a micro base station.

10. The UE according to claim 7, wherein for at least one connection, among the multi-link connections, established between the UE and the micro base station, the parameter receiving apparatus receives the path loss compensating factor and the reference power level thereof from at least one corresponding macro base station in the multi-link connections.

11. A method for uplink transmission power control (TPC) of multi-link connections, wherein a multi-link connection comprises a first connection established between a user equipment (UE) and a macro base station and a second connection established between the UE and a micro base station, the method comprising:
    the macro base station sending respective path loss compensating factors and respective reference power levels for respective carriers of the first connection and the second connection to the UE; and
    the macro base station sending respective uplink transmission power adjustment amounts for the respective carriers of the first connection to the UE.

12. The method according to claim 11, wherein the macro base station sending respective uplink transmission power adjustment amounts of the respective carriers of the first connection comprises sending a TPC command to the UE, the TPC command indicating the respective uplink transmission power adjustment amounts.

13. The method according to claim 11, wherein a respective reference power level comprises a cell reference power level and a user offset, the cell reference power level being sent through a broadcast channel, and the user offset being sent through radio resource control (RRC) signaling.

14. A macro base station for uplink transmission power control (TPC) of multi-link connections, wherein a multi-link connection comprises a first connection established between a user equipment (UE) and the macro base station and a second connection established between the UE and a micro base station, the macro base station comprising:
    a parameter sending apparatus, for sending a path loss compensating factor and respective reference power levels of respective carriers of the first connection and the second connection to the UE; and
    a power adjustment amount sending apparatus, for sending respective uplink transmission power adjustment amounts of respective carriers of the first connection to the UE.

15. The macro base station according to claim 14, wherein the macro base station sending a respective uplink transmission power adjustment amount comprises sending a TPC command to the UE, the TPC command indicating the respective uplink transmission power adjustment amount.

16. A method for uplink transmission power control (TPC) of a multi-link connection, the method comprising:
   a user equipment (UE) receiving respective cell path loss compensating factors and respective reference power levels for respective carriers of connections in the multi-link connection;
   the UE receiving respective uplink transmission power adjustment amounts for the respective carriers of the respective connections in the multi-link connection; and
   the UE measuring respective path losses of each carrier of the respective connections in the multi-link connection; and
   based on the received path loss compensating factors, reference power levels, and uplink transmission power adjustment amounts, and the measured path losses, the UE calculating respective uplink transmission powers for the respective carriers of the respective connections in the multi-link connection; and
   the UE transmitting data on the respective carriers of the respective connections in the multi-link connection based on the respective uplink transmission powers.

17. A user equipment (UE), the user equipment comprising:
   a parameter receiving apparatus, for receiving respective path loss compensating factors and respective reference power levels for respective carriers of respective connections in a multi-link connection of the UE;
   a power adjustment amount receiving apparatus, for receiving respective uplink transmission power adjustment amounts for the respective carriers of the respective connections in the multi-link connection;
   a measurement apparatus, for measuring respective path losses of the respective carriers carrier of the respective connections in the multi-link connection;
   a calculation apparatus, for calculating respective uplink transmission powers of the respective carriers of the respective connections in the multi-link connection based on the received path loss compensating factors, reference power levels, and uplink transmission power adjustment amounts, and the measured path losses; and
   a transmission apparatus, for transmitting data on the respective carriers of the respective connections in the multi-link connection based on the uplink transmission powers.

* * * * *